United States Patent
Swennen et al.

(10) Patent No.: US 12,195,393 B2
(45) Date of Patent: Jan. 14, 2025

(54) FIBER FOR CONCRETE REINFORCEMENT

(71) Applicant: ADFIL N.V., Zele (BE)

(72) Inventors: Ives Swennen, Hansbeke (BE); Özlem Aslan, Ghent (BE); Jeroen Smet, Waasmunster (BE); Lien Van Der Schueren, Aalst (BE); Luc Ruys, Lokeren (BE)

(73) Assignee: ADFIL N.V., Zele (BE)

( * ) Notice: Subject to any disclaimer, the term of this patent is extended or adjusted under 35 U.S.C. 154(b) by 721 days.

(21) Appl. No.: 17/286,977

(22) PCT Filed: Aug. 29, 2019

(86) PCT No.: PCT/EP2019/073100
§ 371 (c)(1),
(2) Date: Apr. 20, 2021

(87) PCT Pub. No.: WO2020/088821
PCT Pub. Date: May 7, 2020

(65) Prior Publication Data
US 2021/0387911 A1    Dec. 16, 2021

(30) Foreign Application Priority Data

Oct. 31, 2018  (EP) .................................. 18203640
May 6, 2019   (EP) .................................. 19172771

(51) Int. Cl.
| | |
|---|---|
| *C04B 16/06* | (2006.01) |
| *D01D 5/00* | (2006.01) |
| *D01F 1/10* | (2006.01) |
| *D01F 6/06* | (2006.01) |
| *D01F 6/64* | (2006.01) |

(52) U.S. Cl.
CPC ......... *C04B 16/0633* (2013.01); *D01D 5/00* (2013.01); *D01F 1/10* (2013.01); *D01F 6/06* (2013.01); *D01F 6/64* (2013.01); *D10B 2321/022* (2013.01); *D10B 2401/063* (2013.01)

(58) Field of Classification Search
None
See application file for complete search history.

(56) References Cited

U.S. PATENT DOCUMENTS

| | | | |
|---|---|---|---|
| 3,318,655 A | | 5/1967 | Morio et al. |
| 4,568,723 A | * | 2/1986 | Lu .......................... C08L 23/12 |
| | | | 525/146 |
| 2002/0182408 A1 | * | 12/2002 | Rieder ...................... C08J 5/04 |
| | | | 428/364 |
| 2016/0145773 A1 | * | 5/2016 | Sémelas Ledesma ...................... |
| | | | D01D 10/02 |
| | | | 524/570 |
| 2017/0217835 A1 | * | 8/2017 | Cui .......................... C04B 28/14 |

FOREIGN PATENT DOCUMENTS

| | | | | |
|---|---|---|---|---|
| CN | 1200154 C | * | 5/2005 | ......... C04B 16/0633 |
| CN | 104499086 A | * | 4/2015 | |
| KR | 2015 0107910 A | | 9/2015 | |

OTHER PUBLICATIONS

Machine Translation for CN1200154C (Year: 2005).*
Machine Translation for CN104499086 (Year: 2015).*
Oct. 16, 2019 International Search Report issued in International Patent Application No. PCT/EP2019/073100.
Oct. 16, 2019 Written Opinion issued in International Patent Application No. PCT/EP2019/073100.
Nov. 27, 2020 International Preliminary Report on Patentability issued in International Patent Application No. PCT/EP2019/073100.
A. Richardson. "Post Crack Flexural Toughness in Steel Fabric and Fibre Reinforced Concrete Beams". Jan. 1, 2008, XP002788954, Retrieved from the Internet: URL: http://nrl.northumbria.ac.uk/3541/1/Richardson%20-%20Post%20crack%20flexural%20toughness...%20Article.pdf [retrieved on Feb. 14, 2019].
ER Silva et al. "Hybrid Polyethylene/Polypropylene Blended Fiber-Reinforced Cement Composite". Sep. 18, 2016, XP002788955, Retrieved from the Internet: URL: http://citeseerx.ist.psu.edu/viewdoc/download?doi=10.1.1.1007.9771&rep=rep1&type=pdf [retrieved on Feb. 15, 2019].

* cited by examiner

*Primary Examiner* — Michael Forrest
(74) *Attorney, Agent, or Firm* — Oliff PLC

(57) ABSTRACT

A fiber for concrete reinforcement is provided including 85 wt. % to 98 wt. % of a polypropylene, 2 wt. % to 10 wt. % of a polycarbonate, and up to 5 wt. % of a compatibilizer, wherein the fiber has a tensile strength of at least 600 MPa and a modulus of at least 6 GPa.

16 Claims, 1 Drawing Sheet

FIBER FOR CONCRETE REINFORCEMENT

Figure 1A:
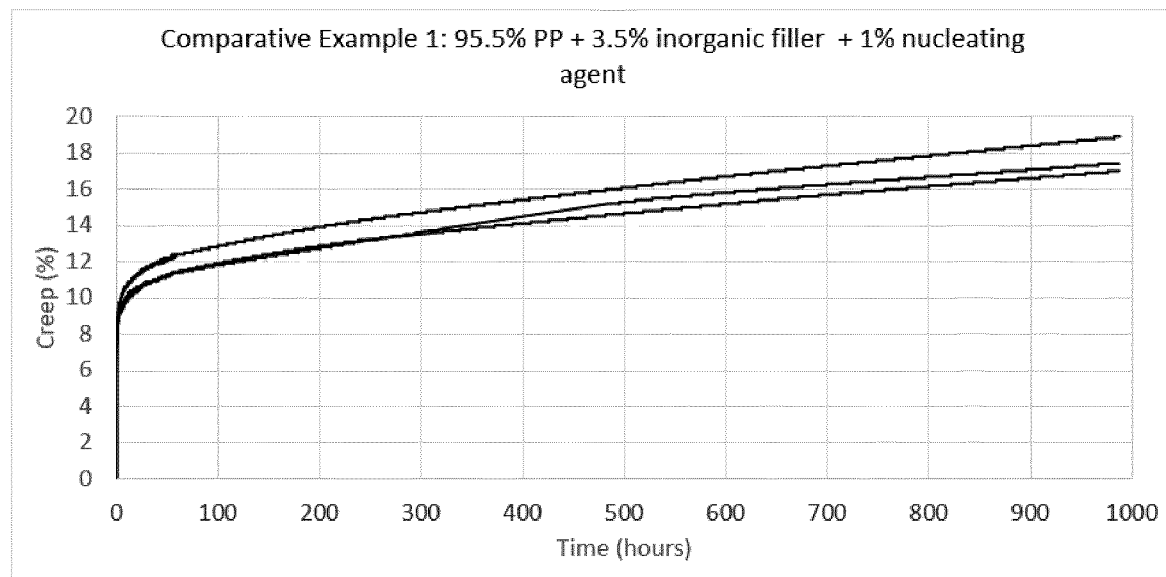

The invention pertains to synthetic fibers for concrete reinforcement.

Fiber reinforced concrete (FRC) is not a new concept. Since biblical times fibers were used in cementing construction materials in the form of straw and horse hair. In more recent times the asbestos fiber was used extensively in structural components like wall panels, roofs and gates. In the early 1960's the health risk of manufacturing and using asbestos fibers became apparent and alternative fibers were introduced as a replacement.

After asbestos fibers, steel fiber was one of the first possible alternatives to steel bar reinforcing, with the first patent being applied for in 1874. It was however only in the early 1970's that the use of these fibers on a large scale was noticed in the USA, Japan and in Europe.

Fibers are used in concrete to increase mechanical properties of concrete, to improve the volume stability of concrete, and to prevent cracking due to shrinkage of concrete. They also reduce the formation of drying and plastic shrinkage cracks to a minimum and improve concrete properties by increasing fire resistance, shock and impact resistance, and abrasion resistance of concrete.

Compared to steel fibers, synthetic fibers have the advantage of being non-corrosive, therefore being durable even in humid environments.

Synthetic fibers, in particular polypropylene fibers, can be used as fibers for concrete reinforcement, in particular in concrete which is subjected to compressive loads, such as for example concrete floor slabs applied on a subfloor, or in shotcrete applications. The synthetic fibers are generally applied to prevent, or at least reduce, the formation of cracks in the concrete and/or to increase the post-crack residual flexural tensile strength of the concrete, which enables to reduce post-crack deformation of the concrete.

Polypropylene (PP) fibers can be applied to the concrete in various forms, in particular as staple fibers, the staple fibers having small or large fiber diameters and/or various surface structures.

Polypropylene fibers with relatively small diameters are commonly known as "microfibers". The equivalent fiber diameter of microfibers, determined according to EN 14889 fibers for concrete, part 2: polymer fibers, ranges from less than 10 µm to about 300 µm. Macrofibers of polypropylene (PP) have an equivalent fiber diameter of at least 300 µm.

Polypropylene macrofibers are in particular applied to improve the post-crack behaviour of concrete. They can replace steel mesh or steel fibres in non-structural applications like ground supported floor slabs and compression loaded applications.

Increasing the tensile strength and/or the modulus of the synthetic fibers play an important role in increasing the post-crack residual flexural tensile strength of the fiber reinforced concrete.

Increasing the amount of synthetic fibers in the concrete generally reduces the formation of cracks in the concrete, and increases the post-crack residual flexural tensile strength of the concrete. However, a too high amount of synthetic fibers in the concrete hinders the workability of the concrete mixture thereby causing problems in handling the concrete mixture when forming a concrete element and/or deteriorating the quality of the concrete element.

There thus remains a need to provide synthetic fibers having increased tensile strength and/or increased modulus to improve the post-crack residual flexural tensile strength of the fiber reinforced concrete and/or to enable a reduction of the amount of synthetic fibers in the concrete.

The object of the invention is to provide synthetic fibers for concrete reinforcement having increased tensile strength and/or increased modulus.

The object of the invention is achieved by the fiber for concrete reinforcement according to claim 1.

Figure 1B:
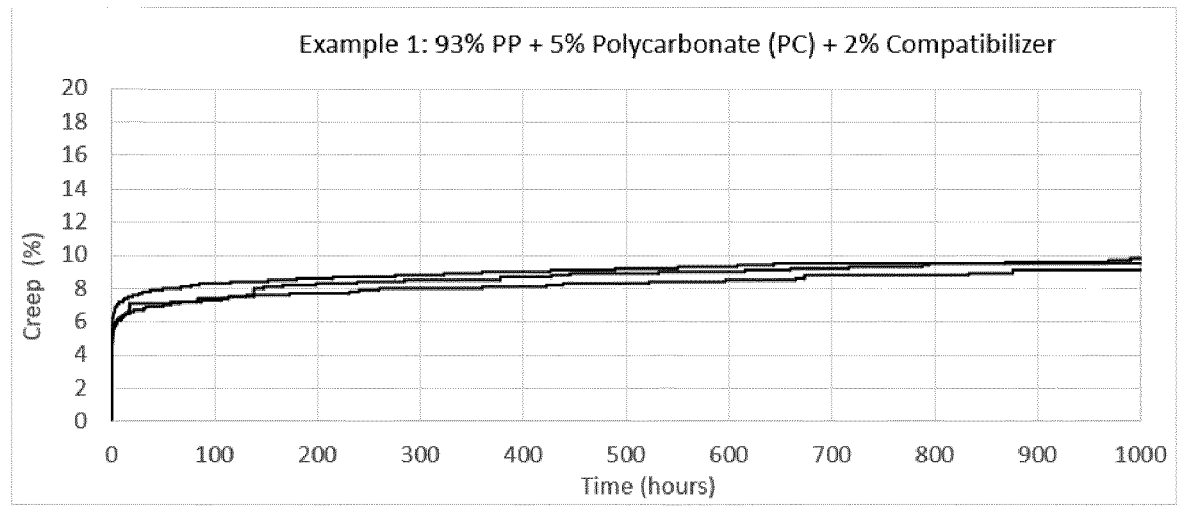

FIG. 1a is a graph showing creep as a function of time for Comparative Example 1. FIG. 1b is a graph showing creep as a function of time for Example 1.

A fiber for concrete reinforcement which comprises 85 wt. % to 98 wt. % of a polypropylene and 2 wt. % to 10 wt. % of a polycarbonate has an increased tensile strength and/or an increased modulus as compared to fibers consisting of polypropylene, which enables to increase post-crack residual flexural tensile strength of the concrete. Alternatively, the amount of fibers in the concrete can be reduced at constant post-crack residual flexural tensile strength which enables better handling, in particular the workability, of the concrete mixture.

The post-crack residual flexural tensile strength of concrete is determined, in accordance with test method EN 14651 "Test method for metallic fibre concrete—Measuring the flexural tensile strength (limit of proportionality (LOP), residual)", by a three-point bending test on a rectangular concrete beam having a length of 60 cm, a width of 15 cm and a height of 15 cm, the beam comprising a notch formed along the width and transversely to the length at the lower side of the beam. Load is applied on the upper side of the beam directly opposite to the notch. The vertical displacement and the strength at specified opening width of the notch, also known as crack mouth opening displacement or CMOD, are relevant characteristics of the fiber reinforced concrete (FRC). In particular the strength, measured in MPa, at a CMOD of 0.5 mm ($f_{R,1}$) and at a CMOD of 3.5 mm ($f_{R,4}$) are important characteristics of fiber reinforced concrete.

Alternatively, in particular for shotcrete applications, the strength of concrete is determined in accordance with a round plate test according to ASTM C1550, the round concrete plate having a diameter of 80 cm and a thickness of 7.5 cm, in which the total energy absorption to 40 mm deflection is determined, or in accordance with a square plate test according to EN14488/5, the square concrete plate having a length and a width of 60 cm and a thickness of 10 cm, in which the total energy absorption to 30 mm deflection is determined.

A fiber for concrete reinforcement which comprises 85 wt. % to 98 wt. % of a polypropylene and 2 wt. % to 10 wt. % of a polycarbonate can have improved creep resistance as compared to fibers consisting of polypropylene as the fiber comprises 85 wt. % to 98 wt. % of a polypropylene and 2 wt. % to 10 wt. % of a polycarbonate can be drawn at a higher draw ratio as compared to fibers consisting of polypropylene, thereby resulting in increased post-crack safety for the fiber reinforced concrete. Preferably, the fiber has an average creep of 15% or less, more preferably 10% or less. Creep has been determined by image acquisition as the elongation of the fiber after 960 hours of subjecting the fiber to a vertical sustained loading corresponding to 50% of the tensile strength of the fiber. The average value for three fibers is determined.

In a preferred embodiment the fiber according to the invention is spun from a blend comprising 85 wt. % to 98 wt. % of a polypropylene and 2 wt. % to 10 wt. % of a polycarbonate. Although not being fully understood, it has been found that spinning a fiber from a blend comprising 85 wt. % to 98 wt. % of a polypropylene and 2 wt. % to 10 wt.

% of a polycarbonate, provides a fiber having increased tensile strength as compared to fibers consisting of a polypropylene, i.e. not comprising 2 wt. % to 10 wt. % of a polycarbonate. In addition, the fiber spun from a blend comprising 85 wt. % to 98 wt. % of a polypropylene and 2 wt. % to 10 wt. % of a polycarbonate can be drawn at a higher draw ratio thereby enabling to increase the modulus of the fiber.

In an embodiment, the fiber comprises 88 wt. % to 95 wt. % of the polypropylene to achieve an optimum increase in tensile strength and/or an optimum increase in modulus of the fiber.

In an embodiment, the fiber comprises 3 wt. % to 8 wt. % of the polycarbonate, preferably 4 wt. % to 6 wt. % of the polycarbonate, to achieve a higher increase in tensile strength and/or a higher increase in modulus of the fiber.

The fiber for concrete reinforcement according to the invention preferably has a tensile strength of at least 600 MPa, preferably at least 650 MPa, more preferably at least 700 MPa as determined according to EN 14889-2.

The fiber for concrete reinforcement according to the invention preferably has a modulus of at least 6 GPa, more preferably at least 7 GPa, more preferably at least 8 GPa, even more preferably at least 9 GPa, most preferably at least 10 GPa as determined according to EN 14889-2, wherein the modulus of the fiber is determined between 10% and 30% of the tensile strength of the fiber.

The fiber comprising 85 wt. % to 98 wt. % of a polypropylene and 2 wt. % to 10 wt. % of a polycarbonate can advantageously be used for concrete reinforcement as the polypropylene and the polycarbonate are not susceptible to corrosion, and are durable in highly alkaline environments.

In an embodiment, the fiber for concrete reinforcement according to the invention comprises 1 wt. % to 5 wt. % of a compatibilizer. The application of a compatibilizer in the blend from which the fiber is spun, increases the tensile strength of fiber at equal draw ratio, and enables to increase the modulus of the fiber at higher draw ratios which could not be applied when spinning a fiber from a blend without the compatibilizer. Although not being bound to theory, it is believed that the compatibilizer reduces the size of polycarbonate domains in the blend from which the fiber is spun, thereby creating a larger interfacial area between the polypropylene and the polycarbonate in the fiber enabling improved orientation of the polypropylene in the fiber.

The compatibilizer may be a styrene-ethylene-butylene-styrene copolymer.

Preferably, the compatibilizer is a maleic acid grafted polymer, preferably a maleic acid grafted polypropylene polymer or a maleic acid grafted styrene-ethylene-butylene-styrene copolymer.

In an embodiment, the fiber for concrete reinforcement according to the invention comprises an inorganic additive to increase adhesion of the fiber to concrete, the inorganic additive preferably being selected from the group consisting of calcium carbonate, calcium sulphate, talc and barium sulphate. Preferably, the fiber comprises 1 wt. % to 5 wt. % of inorganic additive.

Preferably, the fiber has an equivalent fiber diameter, as can be calculated from the linear density of the fiber and the material density, of at least 300 μm, preferably in the range of 500 μm to 1000 μm, as determined according to EN 14889-2, to provide sufficient residual flexural tensile strength without adversely affecting the workability of a concrete mixture comprising the fibers. Preferably, the fiber has a largest dimension, of 2000 μm or less, more preferably 1500 μm or less, the largest dimension being the maximum distance defined by a straight line between two opposing sides of the fiber cross-sectional area, the straight line crossing the center of gravity of the cross-sectional area. Fibers or tapes having a largest dimension higher than 2000 μm can cause problems in handling the concrete mixture, in particular reducing the workability of the concrete mixture, and/or deteriorating the quality of the concrete element. The fiber according to the invention enables to use fibers of smaller equivalent diameter in fiber reinforced concrete at equal post-crack residual flexural tensile strength of the concrete.

The fiber may have any cross-sectional shape, including a circular cross-sectional shape, a triangular cross-sectional shape, a multi-lobal cross-sectional shape, such as for example a trilobal cross-sectional shape, or a dog-bone cross-sectional shape. The fiber may also have an asymmetric cross-sectional shape such that the fiber is configured to form a helical structure to increase the friction between the fiber and concrete increasing the strength of the fiber reinforced concrete at a crack mouth opening displacement of 3.5 mm ($f_{R,4}$).

Preferably, the fiber has a non-circular cross-sectional shape, more preferably a dog-bone cross-sectional shape, to increase the friction between the fiber and concrete increasing the strength of the fiber reinforced concrete at a crack mouth opening displacement of 3.5 mm ($f_{R,4}$).

The fiber preferably has an embossed surface to increase the friction between the fiber and concrete to increase the strength of the fiber reinforced concrete at a crack mouth opening displacement of 3.5 mm ($f_{R,4}$). The embossing on the surface of the fiber may have any shape, preferably the embossed surface comprises diamond-shaped indentations, preferably in a staggered configuration.

The fiber may have a length in the range of 20 mm to 100 mm, preferably in the range of 30 mm to 70 mm, thereby providing sufficient post-crack residual flexural tensile strength in the fiber reinforced concrete while preventing, or at least reducing, problems in handling the concrete mixture comprising the fibers, in particular the workability of the concrete mixture.

In an embodiment, the fiber for concrete reinforcement comprising 85 wt. % to 98 wt. % of a polypropylene and 2 wt. % to 10 wt. % of a polycarbonate enables to provide fiber reinforced concrete having a strength at a crack mouth opening displacement of 3.5 mm ($f_{R,4}$) which is higher than the strength at a crack mouth opening displacement of 0.5 mm ($f_{R,1}$), i.e. having a ratio $f_{R,4}/f_{R,1}$ of more than 1.

The polypropylene comprised in the fiber according to the invention may be any polypropylene polymer. Preferably, the polypropylene polymer has a melt flow index of 10 g/10 min or less, preferably 5 g/10 min or less, more preferably 3 g/10 min or less, as determined in accordance with ISO 1133 at 230° C./2.16 kg, to further increase the tensile strength of the fiber.

The polypropylene comprised in the fiber according to the invention may be an atactic polypropylene polymer, a syndiotactic polypropylene polymer or an isotactic polypropylene polymer, or any copolymer thereof. Preferably, the polypropylene comprised in the fiber according to the invention is an isotactic polypropylene polymer to further increase the tensile strength of the fiber.

Polycarbonate (PC) is a polymer known to those skilled in the art. A polycarbonate polymer is characterized by its carbonate group in the polymer chain, and can for example be obtained by a polymerization reaction of bisphenol A (BPA) and phosgene ($COCl_2$).

The polycarbonate comprised in the fiber according to the invention may be any polycarbonate polymer. Preferably, the polycarbonate polymer has a melt flow index of 25 g/10 min or less, preferably 20 g/10 min or less, more preferably 15 g/10 min or less, more preferably 10 g/10 min or less, even more preferably 5 g/10 min or less most preferably 3 g/10 min or less as determined in accordance with ISO 1133 at 300° C./1.2 kg, to further increase the tensile strength of the fiber.

The fiber according to the invention can advantageously be used to provide a fiber reinforced concrete (FRC) element.

The concrete element preferably comprises fibers according to any of the embodiments of the fiber above.

The fiber for concrete reinforcement according to the invention enables to reduce the amount of fibers in fiber reinforced concrete without adversely affecting the properties of the concrete. Preferably, the fiber reinforced concrete comprises the fibers in an amount of 10 kg/m$^3$ or less, more preferably in an amount of 5 kg/m$^3$ or less, even more preferably in an amount of 4 kg/m$^3$ or less, most preferably in an amount of 3 kg/m$^3$ or less to prevent, or at least reduce, problems in handling the concrete mixture comprising the fibers, in particular the workability of the concrete mixture, and/or to improve the quality of the concrete element.

The fiber for concrete reinforcement according to the invention enables to provide fiber reinforced concrete having a residual flexural tensile strength at a crack mouth opening displacement of 0.5 mm ($f_{R,1}$) of at least 1.5 MPa, the fiber reinforced concrete preferably comprising the fibers in an amount of 10 kg/m$^3$ or less, more preferably in an amount of 5 kg/m$^3$ or less, even more preferably in an amount of 4 kg/m$^3$ or less, most preferably in an amount of 3 kg/m$^3$ or less.

The fiber for concrete reinforcement according to the invention enables to provide fiber reinforced concrete having a residual flexural tensile strength at a crack mouth opening displacement of 3.5 mm ($f_{R,4}$) of at least 1.0 MPa, the fiber reinforced concrete preferably comprising the fibers in an amount of 10 kg/m$^3$ or less, more preferably in an amount of 5 kg/m$^3$ or less, even more preferably in an amount of 4 kg/m$^3$ or less, most preferably in an amount of 3 kg/m$^3$ or less.

The fiber for concrete reinforcement according to the invention enables to provide fiber reinforced concrete having a total energy absorption of at least 950 J, preferably at least 1000 J, more preferably at least 1050 J, as determined according to EN 14488-5, the fiber reinforced concrete preferably comprising the fibers in an amount of 10 kg/m$^3$ or less, more preferably in an amount of 5 kg/m$^3$ or less, even more preferably in an amount of 4 kg/m$^3$ or less.

A process for manufacturing the fiber for concrete reinforcement according to the invention comprises the steps of supplying a blend 85 wt. % to 98 wt. % of a polypropylene, 2 wt. % to 10 wt. % of a polycarbonate, and up to 5 wt. % of a compatibilizer into an extruder, extruding the blend through a spinneret comprising one or more capillaries to form one or more extruded fibers, cooling the extruded fibers, drawing the extruded fibers, preferably at a draw ratio of at least 10 to form the fibers for concrete reinforcement.

Preferably, the process for manufacturing the fiber according to the invention comprises the step of drawing the extruded fiber at a draw ratio of at least 10 to form the fiber for concrete reinforcement. Preferably, the process for manufacturing the fiber according to the invention comprises the step of drawing the extruded fiber at a draw ratio of at least 11, more preferably at a draw ratio of at least 12, even more preferably at a draw ratio of at least 13. By extruding a blend comprising supplying a blend comprising 85 wt. % to 98 wt. % of a polypropylene and 2 wt. % to 10 wt. % of a polycarbonate, the extruded fiber can be drawn at a higher draw ratio as compared to a fiber consisting of a polypropylene.

Preferably, the process for manufacturing the fiber according to the invention comprises the step of cutting the fiber for concrete reinforcement to a specified length, preferably to a length in the range of 20 mm to 100 mm, preferably in the range of 30 mm to 70 mm.

Preferably, the process for manufacturing the fiber according to the invention comprises the step of supplying a blend into an extruder, the blend comprising 88 wt. % to 95 wt. % of the polypropylene to achieve an optimum increase in tensile strength and/or an optimum increase in modulus of the fiber.

Preferably, the process for manufacturing the fiber according to the invention comprises the step of supplying a blend into an extruder, the blend comprising 3 wt. % to 8 wt. % of the polycarbonate, preferably 4 wt. % to 6 wt. % of the polycarbonate to achieve the highest increase in tensile strength and/or increase in modulus of the fiber.

Surprisingly, the fiber according to invention can be obtained by the process wherein the polypropylene and the polycarbonate are supplied into a single screw extruder. Although a single screw extruder is known for not thoroughly mixing a two or more polymers, an improved fiber is nevertheless obtained.

Preferably, the process for manufacturing the fiber according to the invention comprises the step of supplying a blend into an extruder, the blend comprising 1 wt. % to 5 wt. % of a compatibilizer, enabling to apply a higher draw ratio to the extruded fiber.

The compatibilizer may be a styrene-ethylene-butylene-styrene copolymer.

Preferably, the compatibilizer is a maleic acid grafted polymer, preferably a maleic acid grafted polypropylene polymer or a maleic acid grafted styrene-ethylene-butylene-styrene copolymer.

Preferably, the process for manufacturing the fiber according to the invention comprises the step of supplying a blend into an extruder, the blend comprising an inorganic additive to increase adhesion of the fiber to concrete, the inorganic additive preferably being selected from the group consisting of calcium carbonate, calcium sulphate, talc and barium sulphate. Preferably, the fiber comprises 1 wt. % to 5 wt. % of inorganic additive.

Preferably, the process for manufacturing the fiber according to the invention comprises the step of drawing the extruded fiber at a draw ratio such that the fiber has an equivalent fiber diameter of at least 300 μm, preferably in the range of 500 μm to 1000 μm, as determined according to EN 14889-2. Preferably, the fiber has a largest dimension, of 2000 μm or less, more preferably 1500 μm or less.

Preferably, the process for manufacturing the fiber according to the invention comprises the step of extruding the blend through a spinneret comprising one or more capillaries to form one or more extruded fibers, wherein the capillaries have a circular cross-sectional shape, a triangular cross-sectional shape, a multi-lobal cross-sectional shape, such as for example a trilobal cross-sectional shape, or a dog-bone cross-sectional shape, preferably a non-circular cross-sectional shape, more preferably a dog-bone cross-sectional shape. A fiber having a non-circular cross-sectional shape can be heated more efficiently thereby enabling to apply a higher draw ratio.

Preferably, the process for manufacturing the fiber according to the invention comprises the step of embossing the extruded fiber, preferably with diamond-shaped indentations, preferably in a staggered configuration.

Preferably, the process for manufacturing the fiber according to the invention comprises the step of cutting the fiber to a predefined length, preferably to a length in the range of 20 mm to 100 mm, preferably in the range of 30 mm to 70 mm.

Preferably, the process for manufacturing the fiber according to the invention comprises the step of supplying a blend comprising 85 wt. % to 98 wt. % of a polypropylene, 2 wt. % to 10 wt. % of a polycarbonate, wherein the polypropylene polymer has a melt flow index of 10 g/10 min or less, preferably 5 g/10 min or less, more preferably 3 g/10 min or less, as determined in accordance with ISO 1133 at 230° C./2.16 kg, to further increase the tensile strength of the fiber. The polypropylene supplied in the process according to the invention may be an atactic polypropylene polymer, a syndiotactic polypropylene polymer or an isotactic polypropylene polymer. Preferably, the polypropylene supplied in the process according to the invention is an isotactic polypropylene polymer to further increase the tensile strength of the fiber.

COMPARATIVE EXAMPLE 1

Fibers were spun from a blend of 95.5 wt. % of a polypropylene, 3.5 wt. % of an inorganic filler, and 1 wt. % of nucleating agent.

The fibers were drawn at a draw ratio of 11.9 and had an equivalent diameter of 0.70 mm.

COMPARATIVE EXAMPLE 2

Fibers were spun under the same conditions of Comparative Example 1, except that the fibers were spun from a blend of 98 wt. % of a polypropylene, and 2 wt. % of a compatibilizer. The fibers had an equivalent diameter of 0.70 mm.

EXAMPLE 1

Fibers were spun under the same conditions of Comparative Example 1, except that the fibers were spun from a blend of 93 wt. % of a polypropylene, 5 wt. % of a polycarbonate and 2 wt. % of a compatibilizer.

The fibers were drawn at a draw ratio of 20 and had an equivalent diameter of 0.70 mm.

EXAMPLE 2

Fibers were spun under the same conditions of Comparative Example 1, except that the fibers were spun from a blend of 89.5 wt. % of a polypropylene, 5 wt. % of a polycarbonate, 2 wt. % of a compatibilizer and 3.5 wt. % of an inorganic filler. The fibers had an equivalent diameter of 0.70 mm.

A fiber reinforced concrete beam was formed for each type of fibers, the concrete comprising a fiber dosage of 5 kg/m³. The concrete had a concrete strength class of C25/30, determined according to EN 12390-3 "Testing hardened concrete—compressive strength of test specimens", and a flexural tensile strength of 4.3±0.3 MPa, determined according to EN 14651.

The post-crack residual flexural tensile strength of the concrete beam at a crack mouth opening displacement of 3.5 mm ($f_{R,4}$) was determined, as shown in Table 1, in accordance with test method EN 14651 "Test method for metallic fibre concrete—Measuring the flexural tensile strength (limit of proportionality (LOP), residual)".

TABLE 1

| Example | Fiber Dosage (kg/m3) | $f_{R,4}$ (CMOD = 3.5 mm) (MPa) | % Increase |
| --- | --- | --- | --- |
| Comparative 1 | 5 | 1.78 | — |
| Comparative 2 | 5 | 1.78 | — |
| 1 | 5 | 2.17 | 21.9 |
| 2 | 5 | 2.55 | 43.3 |

Table 1 shows that the performance of synthetic fibers predominantly composed of a polypropylene in fiber reinforced concrete can be improved by approx. 20% by adding 5 wt. % of a polycarbonate and spinning the fibers from a blend comprising polypropylene and polycarbonate.

Table 1 shows that the performance of the synthetic fibers in fiber reinforced concrete can be further improved by approx. 40-45% by additionally adding an inorganic filler and spinning the fibers from a blend comprising polypropylene, polycarbonate, compatibilizer and inorganic filler.

In Table 2 the creep of the fiber of example 1 has been compared to the creep of the fiber of comparative example 1. Table 2 and FIGS. 1a and 1b show that the creep of fiber according to example 1 is reduced by 47% as compared to the fiber according to comparative example 1.

TABLE 2

| Example | Average creep at 960 hours (%) | Reduction in creep (%) |
| --- | --- | --- |
| Comparative 1 | 17.6 | — |
| 1 | 9.4 | 47 |

EXAMPLE 3

The fibers of Example 1 were applied in a spray concrete, also known as shotcrete, with the concrete mixture comprising 440 kg/m³ of CEM I 42.5 N cement and 5 kg/m³ of fibers.

In comparative 3 example 5 kg/m³ of Barchip 54 fibers, being considered an industry standard, were applied in spray concrete with the concrete mixture of example 3, with the type of fibers being the only difference.

In Table 3 the amount of energy absorbed by the shotcrete of example 3 has been compared to the amount of energy absorbed by the shotcrete of comparative example 3, determined as an average of 4 samples, in accordance with ASTM C1550-12a:2013 round plate test.

Table 3 shows that the total energy absorption at 40 mm deflection of the shotcrete of example 3 is increased by 27% as compared to shotcrete comprising the fibers of comparative example 3.

Table 3 also shows that the energy absorption at 5 mm, 10 mm and 20 mm deflection of the shotcrete of example 3 is increased by 17% to 24% as compared to shotcrete comprising the fibers of comparative example 3.

TABLE 3

|  | Comparative Example 3 | Example 3 | Increase (%) |
|---|---|---|---|
| Energy absorption at 5 mm deformation (J) | 42 | 49 | 17 |
| Energy absorption at 10 mm deformation (J) | 79 | 95 | 20 |
| Energy absorption at 20 mm deformation (J) | 139 | 172 | 24 |
| Energy absorption at 40 mm deformation (J) | 214 | 271 | 27 |
| Load at break (kN) | 24.8 | 25.0 | |

EXAMPLE 4

A fiber reinforced concrete beam was formed with the fibers of example 1, the concrete comprising a fiber dosage of 4 kg/m$^3$. The concrete had a flexural tensile strength of 4.5±0.3 MPa, determined according to EN 14651.

The concrete beam had a post-crack residual flexural tensile strength at a crack mouth opening displacement of 3.5 mm ($f_{R,4}$) of 3.20 MPa, and a post-crack residual flexural tensile strength at a crack mouth opening displacement of 0.5 mm ($f_{R,1}$) of 1.87 MPa determined in accordance with test method EN 14651.

The invention claimed is:

1. A fiber for concrete reinforcement wherein the fiber comprises 85 wt. % to 98 wt. % of a polypropylene and 2 wt. % to 10 wt. % of a polycarbonate, and 1 wt. to 5 wt. % of a compatibilizer wherein the fiber has a tensile strength of at least 600 MPa and a modulus of at least 6 GPa as determined according to EN 14889-2, and wherein the compatibilizer is a maleic acid grafted polymer.

2. The fiber for concrete reinforcement according to claim 1 wherein the fiber is spun from a blend comprising 85 wt. % to 98 wt. % of the polypropylene, 2 wt. % to 10 wt. % of the polycarbonate, and 1 wt. to 5 wt. % of the compatibilizer.

3. The fiber for concrete reinforcement according to claim 1 wherein the fiber comprises 3 wt. % to 8 wt. % of the polycarbonate.

4. The fiber for concrete reinforcement according to claim 1 wherein the compatibilizer is a maleic acid grafted styrene-ethylene-butylene-styrene copolymer, or a maleic acid grafted polypropylene polymer.

5. The fiber for concrete reinforcement according to claim 1 wherein the fiber has an equivalent fiber diameter of at least 300 μm, as determined according to EN 14889-2.

6. The fiber for concrete reinforcement according claim 1 wherein the fiber has a non-circular cross-sectional shape.

7. The fiber for concrete reinforcement according to claim 1 wherein the fiber has a tensile strength of at least 650 MPa as determined according to EN 14889-2.

8. The fiber for concrete reinforcement according to claim 1 wherein the fiber has a modulus of at least 7 GPa as determined according to EN 14889-2.

9. A concrete element comprising fibers according to claim 1.

10. The concrete element according to claim 9 wherein the concrete element comprises the fibers in an amount of 10 kg/m$^3$ or less.

11. The concrete element according to claim 9 wherein the concrete element has a post-crack residual flexural tensile strength at a crack mouth opening displacement of 3.5 mm ($f_{R,4}$) of at least 1.0 MPa.

12. A process for manufacturing a fiber for concrete reinforcement having a tensile strength of at least 600 MPa and a modulus of at least 6 GPa as determined according to EN 14889-2, the process comprising the steps of supplying a blend comprising 85 wt. % to 98 wt. % of a polypropylene, 2 wt. % to 10 wt. % of a polycarbonate, and 1 wt. to 5 wt. % of a compatibilizer, wherein the compatibilizer is a maleic acid grafted polymer, into an extruder, extruding the blend through a spinneret comprising one or more capillaries to form one or more extruded fibers, cooling the extruded fibers, drawing the extruded fiber at a draw ratio of at least 10, and cutting the fibers to a specified length.

13. The process for manufacturing a fiber for concrete reinforcement according to claim 12 wherein the blend comprises 3 wt. % to 8 wt. % of the polycarbonate.

14. The process for manufacturing a fiber for concrete reinforcement according to claim 12 wherein the blend is supplied into a single screw extruder.

15. The fiber for concrete reinforcement according to claim 1 wherein the fiber has a circular cross-sectional shape, a triangular cross-sectional shape, a multi-lobal cross-sectional shape, a trilobal cross-sectional shape, a dog-bone cross-sectional shape, or an asymmetric cross-sectional shape such that the fiber is configured to form a helical structure.

16. The process for manufacturing a fiber for concrete reinforcement according to claim 12 wherein the fiber has a circular cross-sectional shape, a triangular cross-sectional shape, a multi-lobal cross-sectional shape, a trilobal cross-sectional shape, a dog-bone cross-sectional shape, or an asymmetric cross-sectional shape such that the fiber is configured to form a helical structure.

* * * * *